Aug. 28, 1956

H. GUTTON ET AL 2,761,091

TUBE FOR ULTRA SHORT WAVES

Filed March 7, 1951

INVENTORS

Henri GUTTON and Charles AZEMA

By

Agent

Aug. 28, 1956

H. GUTTON ET AL 2,761,091

TUBE FOR ULTRA SHORT WAVES

Filed March 7, 1951

INVENTORS
Henri GUTTON and Charles AZEMA

By *Fritz C. Hirschfeld*

Agent

INVENTORS
Henri GUTTON and Charles AZEMA

By
Agent

United States Patent Office 2,761,091
Patented Aug. 28, 1956

2,761,091

TUBE FOR ULTRA SHORT WAVES

Henri Gutton and Charles Azéma, Paris, France, assignors to Compagnie Generale de Telegraphie Sans Fil, a corporation of France Application March 7, 1951, Serial No. 214,269

Claims priority, application France March 20, 1950

7 Claims. (Cl. 315—39.75)

The present invention refers to electronic tubes for ultra short waves and more particularly to tubes of the magnetron type.

Magnetron tubes have been utilized heretofore exclusively as oscillators. Besides, magnetrons have poor frequency properties.

The present invention has for its main object a new magnetron type tube capable of supplying a large output with good efficiency, which tube may be used as an oscillator or as an amplifier.

The invention will be better understood by referring to the drawings which show by way of examples some embodiments of tubes according to the invention and wherein.

Figure 1:
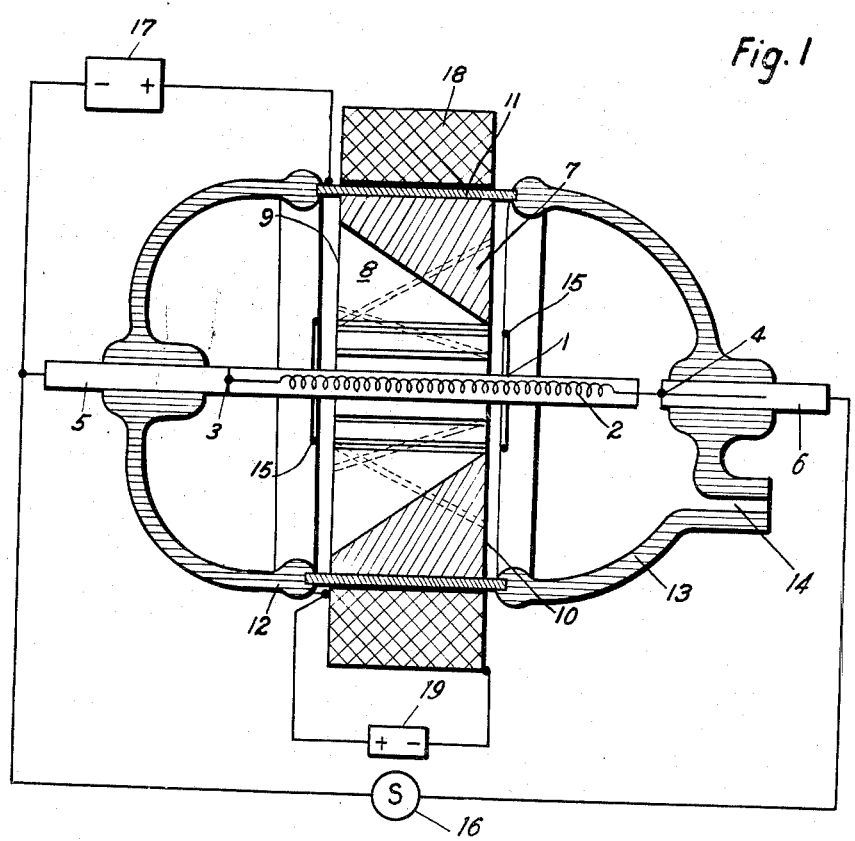
Figure 1 shows a tube according to the invention, in longitudinal section.
Figure 2:
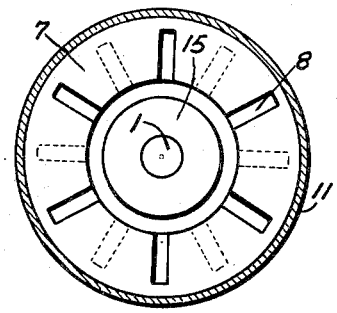
Figure 2 shows the same tube in transversal section, on a reduced scale.

Figure 1 shows in section a tube according to the invention, comprising a cathode 1 preferably having a good secondary electronic emission, and coated with an emissive material. The cathode is heated by a filament 2, connected at 3 and 4 respectively conductive to rods 5 and 6, supplying the current, and made of a metal capable of being sealed to as insulating material. It supports deflectors 15 intended to prevent the electrons from leaving the interaction space. In the anodic block 7, made of a metal having good electrical conductivity, are grooved cavities 8 opening alternately on face 9 or on face 10 of the block 7 as shown in Figs. 1 and 2. The latter is fitted within a cylinder 11 consisting of a metal capable of being soldered to dielectrics. Two bells 12 and 13 of insulating material for example glass, which may be sealed to rods 5 and 6 and to the cylinder 11, form with the latter an envelope which is evacuated through an exhausting appendix 14. The filament is heated by the current provided by a source 16. The anode is positively biased with respect to the cathode by a D. C. source 17, and a magnetic system 18 energized by a D. C. source 19 provides a magnetic field parallel to the cathode.

Fig. 2 is a section of the tube along the lines 2—2' of Fig. 1, and shows in full lines, six cavities opening on the face 9 and six other cavities, in dotted lines, opening on the opposite face 10.

Figure 3:
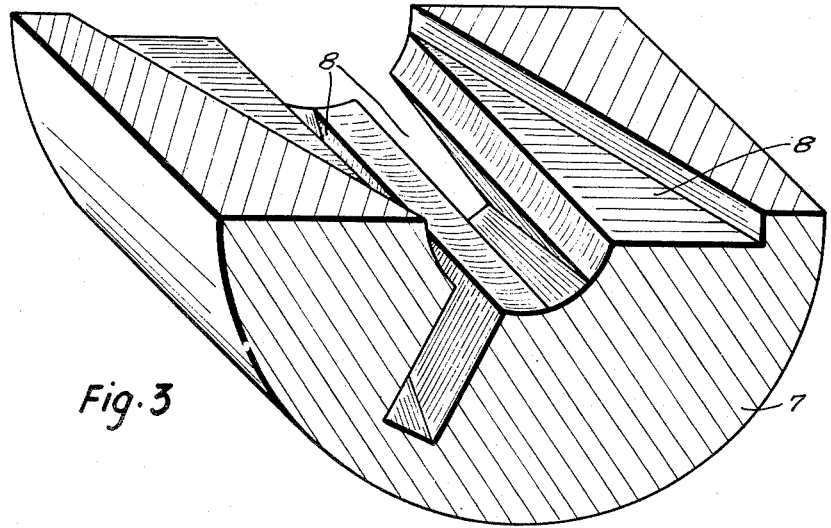
Figure 3 shows, in perspective, a detail of the anodic block of the same tube.

Fig. 3 shows in perspective the half of an anodic block with six cavities.

Figure 4:
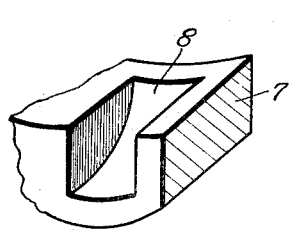
Figures 4, 5, 6 and 7 show different embodiments of the cavities of a tube according to the invention.
Figure 5:
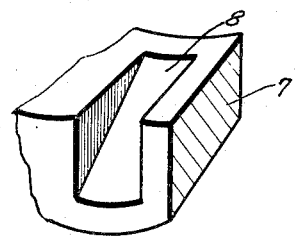
Figure 6:
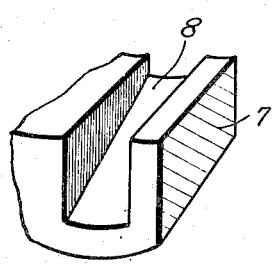

Figs. 4, 5, and 6 show three embodiments of cavities utilized according to the invention. All these cavities have sections increasing from one end to the other, the slope of their respective bottom being in opposite direction in alternate cavities.

Such cavities have considerably improved tuning possibilities.

Figure 7:
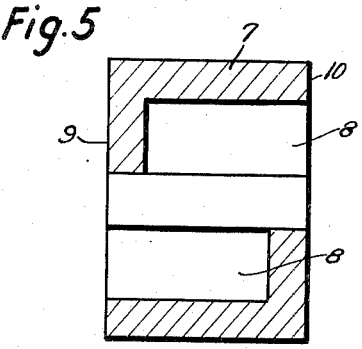

Fig. 7 shows a different embodiment of the tube according to the invention, in which the cavities have constant transverse sections, alternate cavities being closed at opposite ends.

Figure 8:
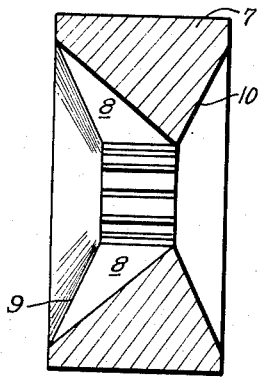
Figure 8 shows a different type of anodic block.

The lateral faces of the anodic block may be plane as shown in Figs. 3 and 7, or have a frusto-conical shape as shown in Fig. 8.

Figure 9A:
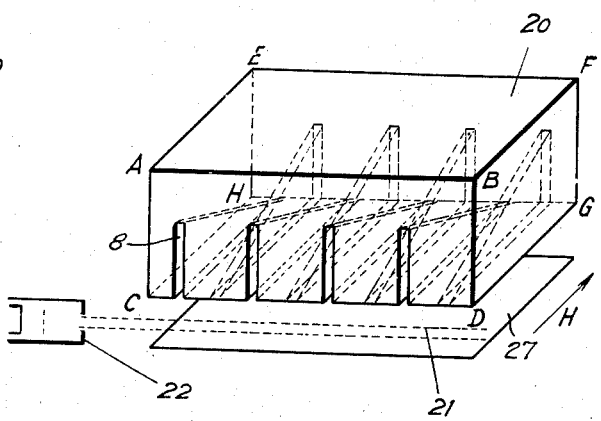
Figure 9a shows a different type of rectilinear tube.
Figure 9:
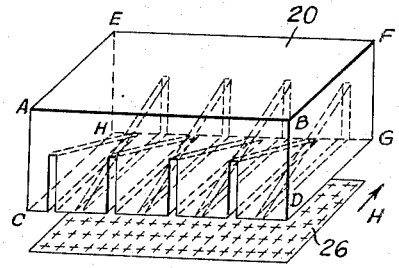
Figure 9 shows a rectilinear tube.

The tube according to the invention may be cylindrical or rectilinear. By way of example, Fig. 9 shows a tube whose cathodic and anodic surfaces are plane. It includes an anodic block 20 limited by two faces ABCD, EFGH, and an emissive cathode 26. Fig. 9a shows a tube of the same type as that of Fig. 9, but in which the cathode 27 is not emitting while having preferably a good secondary emission coefficient. In that case, an electron gun 22 is provided which shoots an electron beam 21 in the interaction space.

Figure 10:
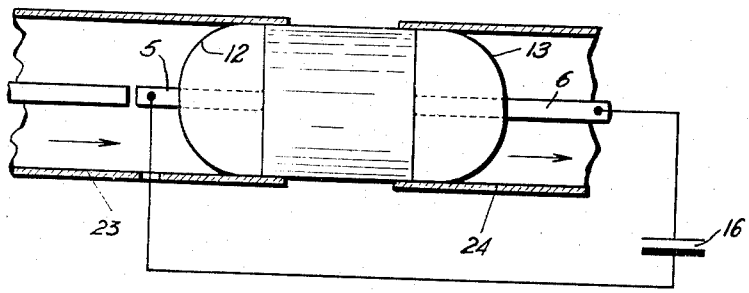
Figure 10 shows an amplifying circuit comprising a tube according to the invention.

Fig. 10 shows an example of an arrangement comprising a tube according to the invention. The tube is fastened by its ends between two coaxial lines 23 and 24. For operating as an amplifier, the tube will advantageously be excited by waves being propagated in the said coaxial lines with circular transverse electric modes. U. H. F. energy is fed to the coaxial line 23 and propagated in the direction of the arrow, and is fed to the coaxial line 24 after having been amplified. Any matching device may be used in order to avoid reflections.

In the rectilinear type of tube, the excitation could be made, for example, by the wave $H_{01}$ being propagated in a rectangular guide or by a plane free wave, polarized parallelly to the cathodic plane.

Figure 11:
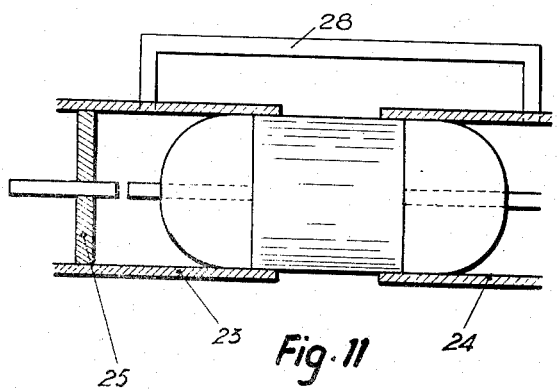
Figure 11 shows an oscillator circuit comprising a tube according to the invention.

Fig. 11 shows an example of the tube used according to the invention in a circuit as oscillator. The arrangement is similar to that of the amplifier of the previous figure, but in addition, it includes, shown in dotted lines, an additional means 28 of coupling, such as a coaxial line for example, joining the drawing out element to the exciting element so as to ensure the feed-back necessary for producing the oscillations. The adjustable piston 25 permits to vary the resonance frequency in modifying the volume included between that piston and the block of the tube.

What we claim is:

1. A magnetron comprising a cathode; a block-shaped anode defining a space with said cathode, said block-shaped anode having opposite end faces substantially at right angles with respect to said cathode; and a plurality of first and second cavity resonators provided in said block-shaped anode between said opposite end faces thereof and communicating with said space defined by said cathode and said block-shaped anode and being closed on the side of said anode opposite said cathode, said first and second cavity resonators alternating with one another; said first cavity resonators forming, respectively, first openings in one of said opposite end faces of said block-shaped anode, said first cavity resonators being closed toward the other of said opposite end faces of said block-shaped anode, said second cavity resonators forming, respectively, second openings in said other of said opposite end faces of said block-shaped anode, said second cavity resonators being closed toward said one of said opposite end faces of said block-shaped anode.

2. A magnetron comprising a cathode; a block-shaped anode surrounding said cathode and defining a space with said cathode, said block-shaped anode having opposite end faces substantially at right angles with respect to said cathode; and a plurality of first and second cavity resonators provided in said block-shaped anode between said opposite end faces thereof and communicating with said space defined by said cathode and said block-shaped anode and being closed on the side of said anode opposite said cathode, said first and second cavity resonators alternating with one another, said first cavity resonators forming, respectively, first openings in one of said opposite end faces of said block-shaped anode, said first cavity resonators being closed toward the other end of said opposite end faces of said block-shaped anode, said second cavity resonators forming, respectively, second openings in said other of said opposite end faces of said block-shaped anode, said second cavity resonators being closed toward said one of said opposite end faces of said block-shaped anode.

3. A magnetron comprising a cathode; a block-shaped anode surrounding said cathode and defining a space with said cathode, said block-shaped anode having opposite end faces substantially at right angles with respect to said cathode; and a plurality of first and second cavity resonators provided in said block-shaped anode between said opposite end faces thereof and communicating with said space defined by said cathode and said block-shaped anode and being closed on the side of said anode opposite said cathode, said first and second cavity resonators alternating with one another; said first cavity resonators having cross sections increasing progressively in directions toward one of said opposite end faces of said block-shaped anode, and said second cavity resonators having cross sections decreasing progressively in directions toward said one of said opposite end faces of said block-shaped anode.

4. A magnetron comprising a cathode, a block-shaped anode surrounding said cathode and defining an interaction space with said cathode, said anode block having opposite end faces substantially at right angles to said cathode, and first and second cavity resonators in said anode opening substantially over the whole length of said anode into said interaction space and being closed on the side of the anode opposite said cathode, said first and second cavity resonators opening alternately into the one end face of the anode and being closed at the other end face thereof.

5. A magnetron comprising a cathode, a block-shaped anode surrounding said cathode and defining a space with said cathode, said anode block having opposite end faces substantially at right angles to said cathode, a plurality of first and second cavity resonators formed inside said anode between said opposite end faces thereof, said first and second cavity resonators communicating with said space defined by said cathode and anode block and being closed on the side of the anode opposite said cathode, and openings formed on each of said end faces of said anode block, said openings on one end face of the anode communicating with said first cavity resonators and said openings on the other end face of said anode communicating with said second cavity resonators.

6. An amplifying magnetron as claimed in claim 5, wherein said first cavity resonators form input circuits and said second cavity resonators form output circuits.

7. A magnetron comprising a cathode, and an anodic block having a plurality of cavity resonators opening towards the cathode into the space between said anodic block and said cathode and two end spaces on each end of said anodic block, the said cavity resonators being in two groups, said cavity resonators of one group alternating with the cavity resonators of the other group in said anodic block, said anodic block being provided with coupling apertures arranged between said cavity resonators and said end spaces, said cavity resonators of one of said groups being predominantly coupled with one of said end spaces, said cavity resonators of the other group being predominantly coupled with the other of said end spaces.

References Cited in the file of this patent

UNITED STATES PATENTS

| | | |
|---|---|---|
| 2,270,777 | Von Baeyer | Jan. 20, 1942 |
| 2,412,372 | Usselman | Dec. 10, 1946 |
| 2,474,898 | Heising | July 5, 1949 |
| 2,477,122 | Garner | July 26, 1949 |
| 2,485,401 | McArthur | Oct. 18, 1949 |
| 2,493,423 | Spooner et al. | Jan. 3, 1950 |
| 2,523,841 | Nordsieck | Sept. 26, 1950 |
| 2,610,309 | Gutton | Sept. 9, 1952 |